March 17, 1942.   W. R. TALIAFERRO   2,276,633
ROTARY CONVERTER CONTROL SYSTEM
Filed April 14, 1938
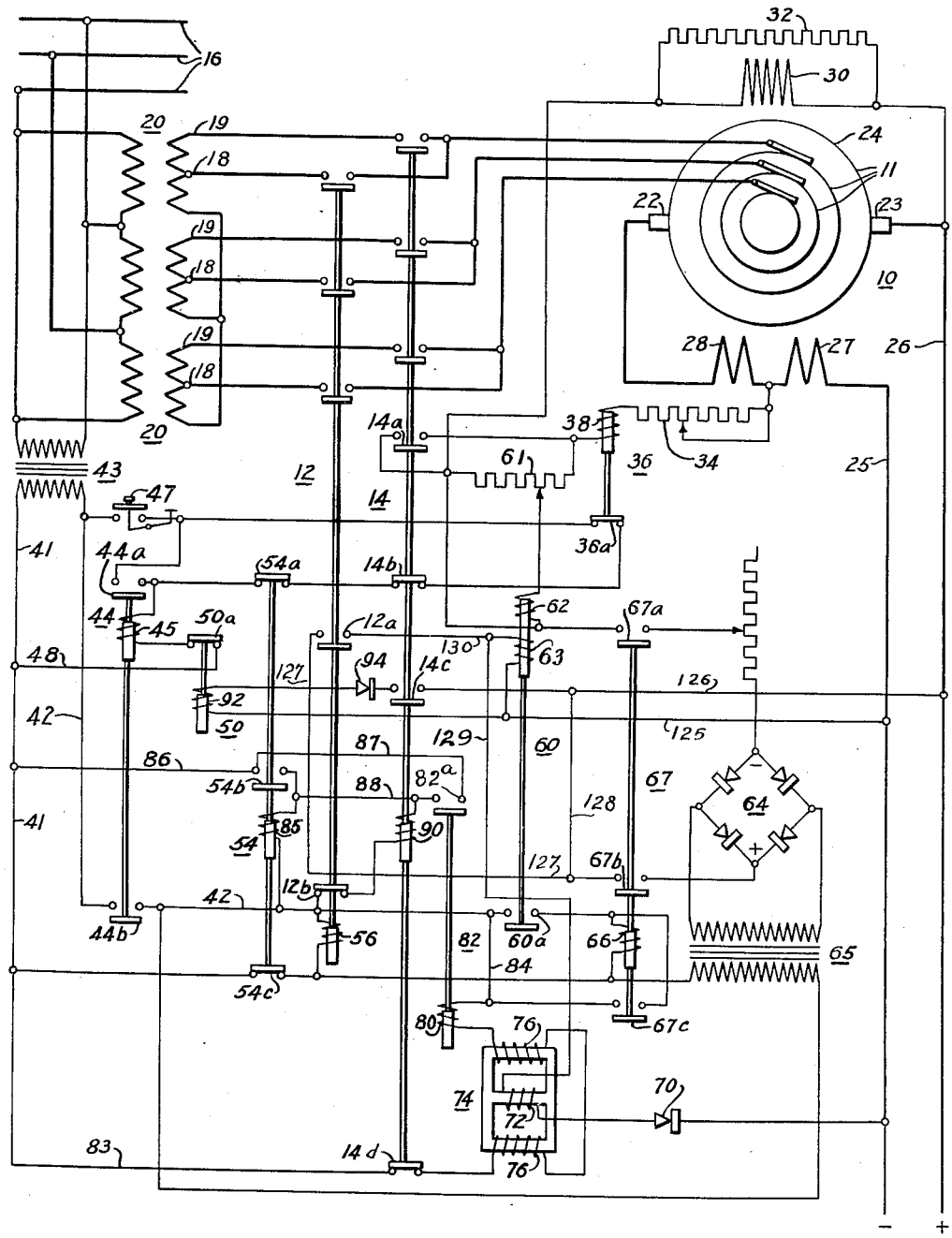
WITNESSES:
N. F. Susser
G. V. Giolma
INVENTOR
William R. Taliaferro.
BY G. W. Crawford
ATTORNEY Patented Mar. 17, 1942

2,276,633

UNITED STATES PATENT OFFICE 2,276,633

ROTARY CONVERTER CONTROL SYSTEM

William R. Taliaferro, Pittsburgh, Pa., assignor to Westinghouse Electric & Manufacturing Company, East Pittsburgh, Pa., a corporation of Pennsylvania Application April 14, 1938, Serial No. 201,937

3 Claims. (Cl. 171—123)

My invention relates, generally, to control systems, and it has particular reference to automatic starting and control systems for synchronous rotary converters.

Heretofore, it has been the usual practice in starting rotary converters to first connect the armature to a reduced or low voltage source by means of a starting breaker, and then transfer the armature connection to a high or running voltage source by opening the starting breaker and closing a running breaker, attempting to determine the polarity of the direct current terminals of the converter after it is synchronized by utilizing auxiliary exciting means to "flash" the direct current field winding with excitation current of the desired polarity while the starting breaker is still closed and the converter is operating at substantially synchronous speed on the low voltage starting source.

It has been found, however, that this procedure does not always produce the desired results and that the converter may become finally synchronized when connected to the high voltage running source with the polarity of its direct current terminals reversed from the desired polarity. This may occur for a number of reasons. Under normal conditions, the elapse of time between the opening of the starting breaker and the closing of the running breaker is not sufficient to let the armature fall back more than 20 or 30 electrical degrees from its synchronous position, and the machine remains synchronized with the desired polarity. However, if for any reason, this transition period is extended appreciably, or a line disturbance occurs which momentarily lowers the voltage of the source just prior to the time the running breaker closes, or the characteristics of the line are such that, when the running breaker closes, the synchronizing current drawn by the machine is so limited that the machine does not readily pull into synchronism with the desired polarity, it may "slip a pole" and become synchronized with reversed polarity.

Therefore, it is highly desirable to provide a starting and control system for the converter which shall function to insure the correct or desired polarity of the direct current terminals thereof after the establishment of running conditions and which will function in response to a reversal of polarity at any time from the desired polarity to disconnect the converter from the supply line and initiate another starting sequence or leave it disconnected until started manually.

It is, therefore, generally an object of my invention to provide for insuring the desired polarity of the direct current terminals of a rotary converter after it has been finally connected to the power source.

More specifically, it is an object of my invention to provide a starting and control system for a rotary converter which shall function to cause the converter to develop a predetermined polarity at the direct current terminals during the starting period while operating on reduced starting voltage, and insure the polarity thereof by checking it after the transition period from starting to running voltage and effecting disconnection of the converter from its power source in the event that its polarity becomes reversed from the desired polarity during the transition period or at any time thereafter.

Another object of my invention is to provide a starting and control system for a rotary converter which shall automatically function to disconnect the converter from its power source when the polarity of the direct current terminals thereof becomes reversed from the desired polarity.

A further object of my invention is to provide a starting and control system for a rotary converter which shall function to extend the reverse polarity protection afforded a rotary converter during a starting sequence past the transition period from the starting to running connection, effecting the disconnection of the converter from its power source upon the occurrence of a reversal from the desired polarity of the direct current terminals, and providing for a repetition of the starting sequence in order to correct the polarity.

Other objects will, in part, be obvious, and will, in part, appear hereinafter.

In accordance with my invention, a rotary converter located in an automatic substation or the like, may be started in response to the operation of a starting relay or switch automatically controlled in accordance with certain predetermined conditions at the station or from a remote point. The usual starting and running breakers are provided, together with suitable control circuits and devices for first connecting the armature of the converter to the reduced voltage power source and for subsequently transferring the connection to the high voltage running source when synchronous speed is reached. In addition, provision is made for "flashing" the field winding after the machine has reached synchronous speed, while it is operating from the reduced voltage source and before the running breaker is closed, in order to produce the desired polarity at the direct current terminals, and also for insuring it by checking the polarity after the armature connection has been transferred to the high voltage running source by means responsive to the closure of the running breaker which functions to trip the running breaker and thereby disconnect the machine from the power source in the event that the polarity of the direct current terminals has become reversed during or after the transition period.

In this instance the polarity insuring control may comprise a relay, the winding of which is connected to the direct current terminals of the converter through a uni-directional current device, such, for example, as a copper-oxide rectifier, in response to the closure of the running breaker, the relay being so connected in the starting system as to function to effect opening of the running breaker in some manner in the event that the polarity of the machine becomes reversed from the predetermined or desired polarity for any reason during the transfer period from starting to running voltage or thereafter.

For a more complete understanding of the nature and scope of my invention, reference may be had to the following detailed description taken in connection with the accompanying drawing, in which the single figure is a diagrammatic view of an automatic control system for a rotary converter embodying a preferred form of my invention.

Referring to the drawing, the reference numeral 10 denotes generally a rotary converter having an armature which is provided with slip rings 11 whereby it may be successively connected by means of a starting breaker 12 and a running breaker 14 to a source of alternating current power 16, through the low voltage taps 18 and terminal connections 19 of transformers 20. Brushes 22 and 23 may be associated with the commutator 24 in the usual manner, the direct current buses 25 and 26 being connected thereto through the series field winding 27 and the commutating field winding 28, for supplying direct current power to a load circuit (not shown). The shunt field winding 30 may be shunted by a field discharge resistor 32 and connected across the brushes 22 and 23, in series circuit relation with a shunt field rheostat 34. A field relay 36 may be provided, having its operating coil 38 connected in series circuit relation with the shunt field winding 30, so that the converter may not be started unless the field is deenergized.

In order to provide for controlling the operations of the rotary converter 10, control buses 41 and 42 may be energized from the main power supply 16 through an auxiliary transformer 43. A master relay 44, which controls energization of the control bus 42, may have its operating coil 45 energized from the control buses 41 and 42 upon the operation of a starting switch 47 which may be a manually operated push button switch as shown or a relay operated from a remote point or automatically in response to a predetermined condition at the station in a well known manner. The energizing circuit for relay 44 extends from the control transformer 43, through control bus 41, conductor 48, contact members 50a of a polarity insuring relay 50, coil 45, contact members 54a of a transfer relay 54, the purpose of which will later be explained, auxiliary contact members 14b of the running breaker 14, contact members 36a of the field relay 36, and push-button switch 47, to the control transformer 43.

Operation of the master relay 44 closes contact members 44a and completes an energizing circuit for the operating coil 56 of the starting breaker 12, which extends from the control transformer 43, through control bus 41, contact members 54c of the transfer relay 54, coil 56, control bus 42, contact members 44b of the master relay 44, to the transformer 43. The closure of breaker 12 connects the slip rings 11 of the rotary converter armature to the low voltage taps 18 of the transformer 20, and the armature commences to rotate.

In order to provide for "flashing" the field winding 30 with excitation current of the correct polarity at the proper instant, synchronizing means may be utilized, such as the synchronous speed relay 60, which is provided with a pair of operating coils 62 and 63, the former being disposed in connection with the shunt field winding 30 of the converter across an adjustable control resistance 61, and the latter connected across the direct current buses 25 and 26 through conductor 125, coil 63, conductor 130, the normally open contact members 12a of the starting breaker 12, and conductors 127, 128 and 126. The synchronous speed relay 60 functions to determine when the rotary converter has reached substantially synchronous speed, so that the direct current excitation source 64, which is energized from an auxiliary transformer 65 connected to the control buses 41 and 42, may be connected across the shunt field 30 to "flash" it, and cause the converter to develop a predetermined desired polarity at the direct current terminals. This function may be attained only when the converter has reached substantially synchronous speed, as prior to this time the coil 62 will be energized by an alternating current which is induced in the shunt field winding 30 from the armature, while the coil 63 will be energized by an alternating current which appears across the converter brushes 22 and 23. These currents are substantially 180° out of phase with each other so that the operating effects of these two coils are nullified while these alternating currents flow therein. When the converter reaches synchronous speed, however, these currents are no longer alternating, but are direct, and the direct current voltages across the converter brushes and across the control resistance 61 are of the same polarity so that the operating effects of the coils 62 and 63 are additive and the relay 60 may operate. An energizing circuit for the operating coil 66 of a field flashing relay 67 is then completed from the control transformer 43, control bus 41, contact members 54c, coil 66, contact members 60a, bus 42, contact members 44b, to the control transformer 43. Relay 67 then operates to connect the direct current excitation source 64 across the shunt field winding 30 of the converter to "flash" it and thereby cause the converter to develop a predetermined desired polarity at the direct current terminals.

When the polarity of the direct current terminals of the converter is correctly determined, a uni-directional current device 70, which is connected in series circuit relation with the direct current coil 72 of a three-legged reactor 74, will permit current flow therethrough to substantially reduce the reactance of the alternating current winding 76, as is well known in the art, whereby sufficient current may flow through the operating coil 80 of a polarity indicating relay 82 to cause operation of the relay. The circuit may be traced from the transformer 43, through contact members 44b of the master relay 44, bus 42, conductor 84, operating coil 80, impedance winding 76, contact members 14d of the running breaker 14, conductor 83, bus 41, and back to the transformer 43.

In order to provide for the transfer of the rotary converter armature from the low voltage taps 18, to the main transformer terminals 19, the operating coil 85 of the transfer relay 54 is disposed to be energized in response to the operation of the polarity indicating relay 82, which operates in response to the development of the correct polarity across the direct current buses 25 and 26. The operating circuit for relay 54 extends from the control transformer 43, control bus 41, conductor 86, conductor 87, contact members 82a, conductor 88, coil 85 and control bus 42, through contact members 44b to the control transformer 43. Operation of the transfer relay 54 opens the energizing circuit for the operating coil 56 of the starting breaker 12 by opening its normally closed contact members 54c, and completes an energizing circuit for the operating coil 90 of the running breaker 14, from control transformer 43, contact members 44b of the master relay 44, control bus 42, contact members 12b of the starting breaker, coil 90, and either by way of contact members 82a, conductor 87, and conductor 86, to control bus 41, or by way of conductor 88, contact members 54b and conductor 86, whereby the armature of the converter 10 is connected across the full voltage of the transformer 20. At the moment the transfer relay 54 is energized to effect actuation of the running breaker 14, auxiliary contact members 54c open and deenergize the field flashing relay 67, by opening the circuit of its operating coil 66. This effects an opening of the contact members 67a and 67b, disconnecting the excitation source 64 from the shunt field 30.

In order to insure the desired polarity of the direct current terminals of the converter subsequent to its synchronization upon being connected to the full transformer voltage by closing of the running breaker 14, auxiliary contact members 14c may be provided in association with the running breaker 14, and connected in series circuit relation with the operating coil 92 of the polarity insuring relay 50, to connect it across the direct current buses 25 and 26 upon closure of the running breaker 14. As indicated in the drawing, the relation of the uni-directional current device 94 with the operating coil 92 may be such, that when the direct current bus 26 is positive, and the running breaker 14 is closed, there will be no flow of current through the coil of the polarity insuring relay 50, but when through abnormal conditions the direct current bus 26 is negative, the uni-directional current device 94 will permit current to flow through the operating winding 92 of polarity insuring relay 50, causing the relay to operate, whereby its auxiliary contact members 50a which are connected in series circuit relation with the operating coil 45 of the master relay 44 will be opened, thus deenergizing the master relay which, in turn, opens its auxiliary contact members 44b, deenergizing the control bus 42, so that the running breaker 14 opens, disconnecting the converter from the source.

In the form of my invention shown in the accompanying drawing, it may be seen that so long as the push-button switch 47 remains in the closed position, deenergization of the control system and converter through reversal of the terminal polarity, as effected by operation of the polarity insuring relay 50, will permit repetition of the starting sequence as soon as the converter has substantially again approached the condition of rest, and the field relay 36 is sufficiently deenergized, so that unless the disturbance causing the reversal of terminal polarity persists, the converter will restart and be safely connected to the direct current buses with the proper polarity.

Assuming a start of operations from the deenergized position, the sequence of operation is as follows. Upon closure of the push-button switch 47, the master relay 44 is energized and closes, energizing the control bus 42 and effecting operation of the starting breaker 12 to connect the converter slip rings 11 to the low voltage taps 18 of the transformers 20. When the converter approaches synchronous speed, the synchronous speed relay 60 operates to energize the field flashing relay 67. This connects the excitation source 64 across the field winding 30 of the converter and forces the polarity of the converter to build up correctly. When the terminal polarity has been correctly determined, the polarity indicating relay 82 will be sufficiently energized by the reduction in the impedance of the alternating current windings 76 on the three legged reactor 74, as determined by the flow of direct current through the direct current winding 72 thereof from the converter brushes 22 and 23 to effect its operation. The operation of relay 82 completes the energizing circuit for the transfer relay 54, which operates to open the circuits of the operating coil 56 of the starting breaker, and the operating coil 66 of the field flashing relay 67, at the same time completing the energizing circuit for the operating coil 90 of the running breaker 14. The starting breaker 12 opens, the field flashing relay 67 disconnects the excitation source 64 from the shunt field winding 30, and the running breaker 14 closes, connecting the converter to the line.

Upon closure of the running breaker 14, auxiliary contact members 14c also closed, whereupon the polarity insuring relay 50 is connected across the direct current buses 25 and 26. If the polarity of these buses is correct, the converter will remain in the running condition and may subsequently be connected to the load circuit in any suitable manner. If, however, the terminal polarity of the converter should be, or should become reversed from the desired or correct polarity, current will flow through the unidirectional current device 94 and the operating coil of the polarity insuring relay 50, causing operation of this relay to deenergize the master relay 44 which, in turn, opens its contact members 44a to completely deenergize the control system and effect disconnection of the converter from its source of power. If the push-button switch 47 is maintained in the closed position, a repetition of the starting sequence may be effected as soon as the converter has slowed down sufficiently so that the field current is reduced sufficiently to deenergize the field relay 36 and, permit the contact members 36a to reclose, and complete the energizing circuit for the master relay 44.

In view of the foregoing it will be apparent that my invention provides a new and useful form of protection for automatic power supply systems. Inasmuch as such automatic power supply systems heretofore failed to provide for insuring the terminal polarity of the converter subsequent to the transition from the starting to the running connections, it will be seen that any reversal of terminal polarity occurring during the transition period or at any time subsequent thereto would have serious results, and against this condition my invention hereby provides adequate protection, so that the station may be disconnected from the power source permanently, or caused to effect any number of repetitions of the starting sequence in an attempt to synchronize with the correct polarity.

Since certain changes may be made in the above description, and different embodiments of the invention may be made without departing from the spirit thereof, it is intended that all matter shown in the accompanying drawing or contained in the above description shall be considered as illustrative, and not in a limiting sense.

I claim as my invention:

1. An automatic control system for a rotary converter comprising, means for connecting the armature of the converter to an alternating current source of reduced voltage for starting, control means for providing polarity ensuring excitation of the converter field winding during the starting period, additional means for connecting the armature to an alternating current source of normal running voltage upon the occurrence of predetermined conditions, polarity ensuring means operable after the connection of the armature to the normal voltage source responsive to a reversal of the polarity of the direct current terminals of the converter from a predetermined polarity, and circuit means including auxiliary contacts of said additional means connecting the polarity ensuring means to effect the immediate disconnection of the armature from the alternating current source upon the operation of said means.

2. A control system for a rotary converter having an armature and field winding comprising, means for supplying a reduced voltage to the armature from an alternating current source, polarity insuring means controlled thereby for applying an excitation voltage of predetermined polarity to the field winding, switching means energizable when the armature reaches substantially synchronous speed to apply the full voltage of the source to the armature, polarity insuring means including a unidirectional current device and a relay connected to the direct current terminals of the converter by said switching means, and circuit means controlled by the relay to deenergize the switching means upon a reversal of the polarity of the direct current terminals of the converter from a predetermined polarity.

3. The combination with a rotary converter having an armature and a field winding with switching means for connecting the armature to an alternating current source so as to apply a reduced starting voltage, additional switching means energizable to connect the armature to the source to apply full running voltage thereto, and polarity insuring means for supplying a unidirectional excitation current to the field winding during the starting period to produce a predetermined polarity at the direct current terminals of the converter, of additional polarity insuring means including a unidirectional current device and a relay connected to effect the deenergization of the additional switching means, said additional polarity insuring means being rendered effective only upon the application of full voltage to the armature to respond immediately to a reversal of the polarity of the direct current terminals of the converter from the predetermined polarity.

WILLIAM R. TALIAFERRO.